United States Patent [19]

Wilcke et al.

[11] 4,247,857
[45] Jan. 27, 1981

[54] METHOD FOR CONTROLLING AN ANTENNA OF AN EARTH STATION FOR TELECOMMUNICATION VIA SATELLITES

[75] Inventors: Robert Wilcke, Leiden; Antoon A. J. Otten, Zoeterwoude, both of Netherlands

[73] Assignee: De Staat der Nederlanden, te dezen vertegenwoordigd door de directeur-generaal der Posterijen, Telegrafie en Telefonie, The Hague, Netherlands

[21] Appl. No.: 935,269

[22] Filed: Aug. 21, 1978

[30] Foreign Application Priority Data

Aug. 22, 1977 [NL] Netherlands .................... 7709242

[51] Int. Cl.³ .............................................. G01S 5/02
[52] U.S. Cl. ......................... 343/117 R; 343/100 ST
[58] Field of Search ................. 343/117 R, 100 ST

[56] References Cited

U.S. PATENT DOCUMENTS

| | | | |
|---|---|---|---|
| 3,419,868 | 12/1968 | Clayton, Jr. | 343/113 R |
| 3,842,420 | 10/1974 | Rabow | 343/117 R |
| 4,156,241 | 5/1979 | Mobley et al. | 343/117 R |

*Primary Examiner*—Stephen C. Buczinski
*Attorney, Agent, or Firm*—Frishauf, Holtz, Goodman & Woodward

[57] ABSTRACT

Method for controlling an antenna of an earth station for telecommunication via satellites, which antenna is provided with means to determine the position of the antenna and with means to ascertain the strength of the received signal, the direction of each change of position to be made by the antenna being derived from the change of the signal strength and the attendant change of position in consequence of the uncontrolled changes of position made by the antenna with respect to the position chosen.

3 Claims, 10 Drawing Figures

FIG. 9

VALUES IN MILLIDEGREES

| POSITION | FADING | x | y | FIRST 5 MIN PERIOD | | | | SECOND 5 MIN PERIOD | | | | THIRD 5 MIN PERIOD | | | |
|---|---|---|---|---|---|---|---|---|---|---|---|---|---|---|---|
| | | | | $\mu_x$ | $\sigma_x$ | $\mu_y$ | $\sigma_y$ | $\mu_x$ | $\sigma_x$ | $\mu_y$ | $\sigma_y$ | $\mu_x$ | $\sigma_x$ | $\mu_y$ | $\sigma_y$ |
| 1 | A | 0 | 0 | -0.7 | 2.1 | 0.2 | 5.2 | 1.1 | 2.6 | 1.0 | 4.5 | -0.4 | 1.7 | -0.8 | 3.9 |
| 1 | B | 0 | 0 | 0.5 | 4.8 | -1.5 | 9.1 | -4.5 | 9.9 | 0.8 | 4.4 | 2.1 | 7.7 | -0.2 | 6.3 |
| 1 | C | 0 | 0 | -1.0 | 2.3 | 0.8 | 4.6 | 0.9 | 2.8 | 0.4 | 4.0 | -0.6 | 2.9 | -1.6 | 4.4 |
| 2 | A | 180 | 180 | 178.9 | 8.1 | 179.1 | 16.3 | 181.3 | 7.3 | 182.7 | 8.4 | 179.4 | 11.1 | 172.5 | 11.9 |
| 2 | B | 180 | 180 | 188.1 | 15.3 | 194.3 | 32.9 | 183.5 | 11.2 | 185.8 | 21.0 | 179.1 | 12.4 | 183.3 | 21.0 |
| 2 | C | 180 | 180 | 175.9 | 10.6 | 179.5 | 17.0 | 179.6 | 10.9 | 182.8 | 11.2 | 177.4 | 21.8 | 168.0 | 19.9 |

METHOD FOR CONTROLLING AN ANTENNA OF AN EARTH STATION FOR TELECOMMUNICATION VIA SATELLITES

BACKGROUND OF THE INVENTION

The invention relates to a method for controlling an antenna of an earth station for telecommunication via satellites, which antenna is provided with means to determine the position of the antenna and with means to ascertain the strength of the received signal.

Various known methods make use of the so-called hill-climbing method, so named because in this method there is a continuous search for a position of the antenna in which the received signal is stronger than it was in the preceding position; in other words: in the hilly landscape of signal strengths one always tries to climb. One of the ways to realize this method is the so-called "step-track" method. This "step-track" method is a simple and relatively cheap solution for keeping an antenna pointed at a satellite. The position of the antenna is changed step by step with equal steps of for example 0.01°, both in elevation and in azimuth, it being always tried to find a position in which the received signal is as strong as possible.

The tracking system using the "step-track" method causes in an arbitrary direction a step-by-step change in for example the direction of elevation. If due to this change of position the strength of the received signal measured increases, a next step is made in the same direction, and so forth. When after a number of steps a signal decrease caused by the last step is observed, then one step is made backwards, after which a similar step-by-step change of position is started in the azimuth direction. As the received signal can be subject to strong fluctuations due to atmospheric influences, measuring of the signal strength has to take place over a longer time, for example some minutes, after which the average value is determined. Each change of position of the antenna is time-consuming because of the great slowness of the antenna. Each first step is arbitrary with the risk of a decrease of signal.

The object of the invention is to overcome the drawbacks of the "step-track" method.

Another object of the invention is to provide a method in which the correction of the position of the antenna is effected in such a way that the antenna makes the smallest possible number of steps, because steps calculated beforehand as to their direction and size are made. This object is attained because the direction and the magnitude of each change of position to be made by the antenna are derived from the change of the signal strength and the attendant change of position in consequence of the uncontrolled changes of position made by the antenna with respect to the position chosen.

BRIEF DESCRIPTION OF THE DRAWINGS

FIG. 9 is a table representing deviations in three successive 5 minutes periods.

DETAILED DESCRIPTION

Figure 1:
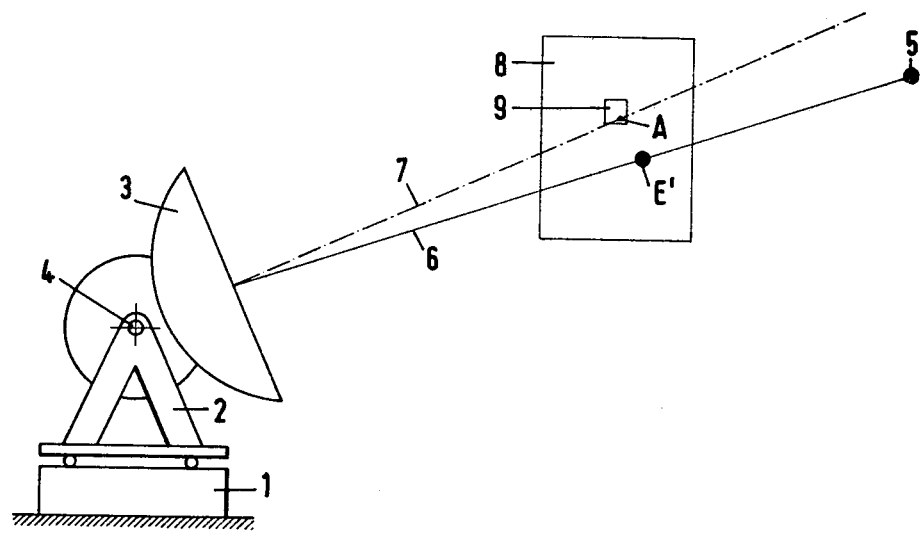
FIG. 1 is a schematic representation of an antenna with respect to a satellite.

FIG. 1 shows a base 1 provided with a support 2, the support 2 being capable of rotating around a vertical axis relative to the base. The support 2 has a horizontal spindle 4 on which an antenna 3 is mounted. The angular position of the support 2 with respect to the base 1 can be determined by means of an angular position indicator, which is not shown; likewise the angular position of the antenna 3 with respect to the support 2 can be determined by a second angular position indicator, which is also not shown. A satellite, for example a geo-stationary one, is represented by a point 5, the line 6 designating the optimum position of the center line of the antenna 3. The actual center line of the antenna 3 is designated by a line 7, which generally forms an angle with the line 6. Due to all sorts of influence, the position of the satellite 5, even in the case of a geo-stationary satellite, is not always the same with respect to the earth and, consequently, not with respect to the antenna either. In order to maintain a maximum reception level of the antenna, the antenna, however, has to be kept pointed at the satellite 5 in the best possible way. In FIG. 1 this means that it attempted to always have the lines 6 and 7 coincide.

Figure 2:
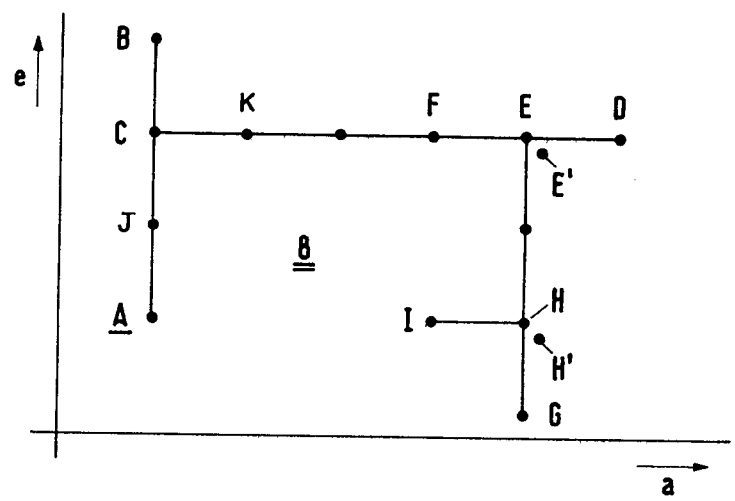
FIG. 2 represents a plane perpendicular to the optimum axis position indicating a possible number of points gone through by the antenna axis according to the known "step-track" method.

One of the ways in which the above can be attained is the so-called "step-track" method. This known method consists in that the strength of the received signal is determined at any time during a certain time period, after which, when not reaching a certain minimum value, the position of the antenna is changed step by step. As the direction in which the first step has to be made is unknown, it is chosen arbitrarily. All this is explained by FIG. 2, in which the azimuth is plotted along the horizontal axis and the elevation along the vertical axis. The center line 7 of the antenna cuts a plane 8 (FIGS. 1 and 2), which is perpendicular to the line 6, at point A; this should, however, be at point E' (FIGS. 1 and 2). If during a certain time priod, for example some minutes, the signal remains lower than a certain fixed value, the antenna makes a fixed step of for example 0.01° in an arbitrary direction; according to FIG. 2 upwards along the elevation axis to point J. If it appears now that the received signal has increased, a next step (to point C) is made in the same direction. After the third step the center line of the antenna coincides with the point B, but now the signal measured is weaker than that of the preceding position, so that the controlling system causes the antenna to make one step backwards to the point C. After this a step is made in an arbitrary direction along the azimuth axis, to, for example, point K. In this case too the steps are repeated in the same direction until a signal is measured which is weaker than the signal obtained after the preceding step (point D), after which a step is made backwards (to point E).

The procedure described above takes a lot of time. Because of the fact that the received signal is not constant in consequence of atmospheric influences, measuring of the signal strength has to take place for some time, so that a reliable average of the strength of the signal can be obtained.

A further drawback is that the direction chosen for the first step is arbitrary and that the direction once chosen is continued as long as after each step the received signal is stronger than the signal measured after the preceding step. If, for example, during the stepping movement from point A to point E the satellite has moved to point H', so that point H would be the most proper point to point the antenna axis at it, then more gain of signal could be obtained by stopping already for the first time at point E coming from the direction of point C along the elevation axis. As described, the controlling system, however, will cause line 7 to reach point E for the third time via the points D and F to cause line 7 to then make steps according to the elevation axis only. Moreover, FIG. 2 shows how point H is now reached, and how from point H the controlling system keeps searching both in azimuth and in elevation (FIG. 1) for a direction with a stronger signal.

According to the invention the aforesaid drawbacks are overcome and the number of steps to be made are considerably reduced. As a consequence a certain desired correction is effected in a much quicker way, whereas thanks to a greater precision a higher average signal is obtained.

Figure 3:
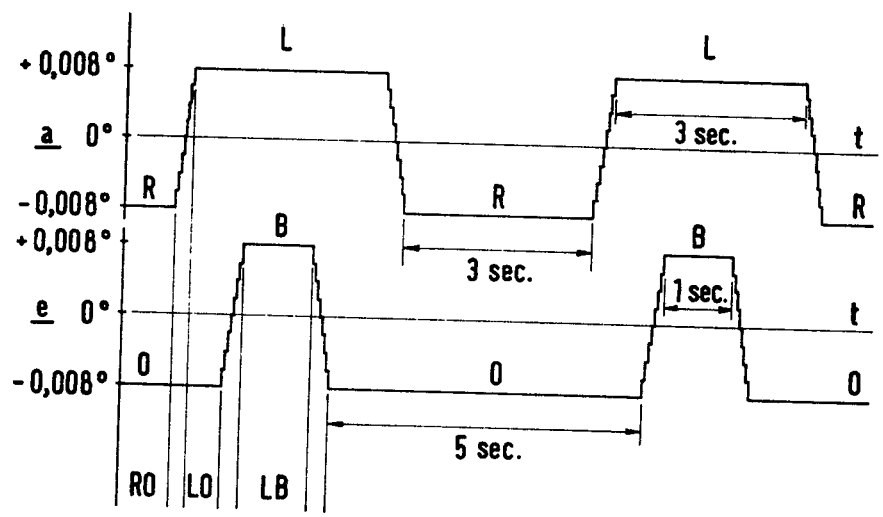
FIG. 3 is a diagram representing the amplitude, plotted against the time, of the uncontrolled movements in azimuth (a) and in elevation (e)

Under the influence of a number of circumstances, such as small instabilities of the controlling system (so-called "limit-cycles"), wind forces, gravity, thermal expansion and shrinking, an antenna for communication by satellites will make, within certain limits, uncontrolled movements with respect to the position chosen. The driving system is continually active in readjusting the antenna to the set value. Measurements on a test antenna have proved that the course in the time of the uncontrolled movements in azimuth is almost as represented in FIG. 3a; the course of those movements in elevation, seen by the digital angle position indicators, is as represented in FIG. 3e. The result in both cases is 0.016° from top to top. The less regular course of the movement in elevation is caused by the unbalance of the antenna.

Figure 4:
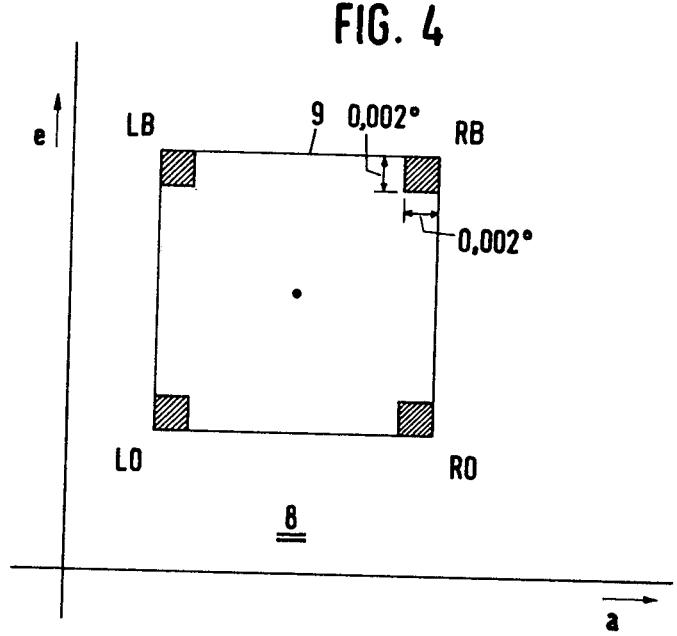
FIG. 4 represents a plane perpendicular to the optimum axis position indicating the resting-points in consequence of the uncontrolled antenna movements as indicated in FIG. 3.

It can be ascertained that both for azimuth and for elevation the antenna is in one of the outermost positions for the greater part of the time (i.e. 96% of the time). This is caused because in the case of a standstill the coefficient of friction at the points of suspension of the antenna is much greater than when moving. In consequence of this it requires relatively much driving power to cause the antenna, when being in one of its two outermost positions, to move. However, once such a movement has started, the speed quickly increases, so that the desired position is gone beyond, after which the controlling system slows down the movement of the antenna and stops it. Then the whole procedure starts again. If these movements are regarded in a plane 9 (part of plane 8 in FIGS. 1, 4), then the antenna axis cuts this plane at one or another of the four points LO, RO, LB, RB for about 96% of the time and it is only about 4% of the time somewhere between these points.

Figure 5:
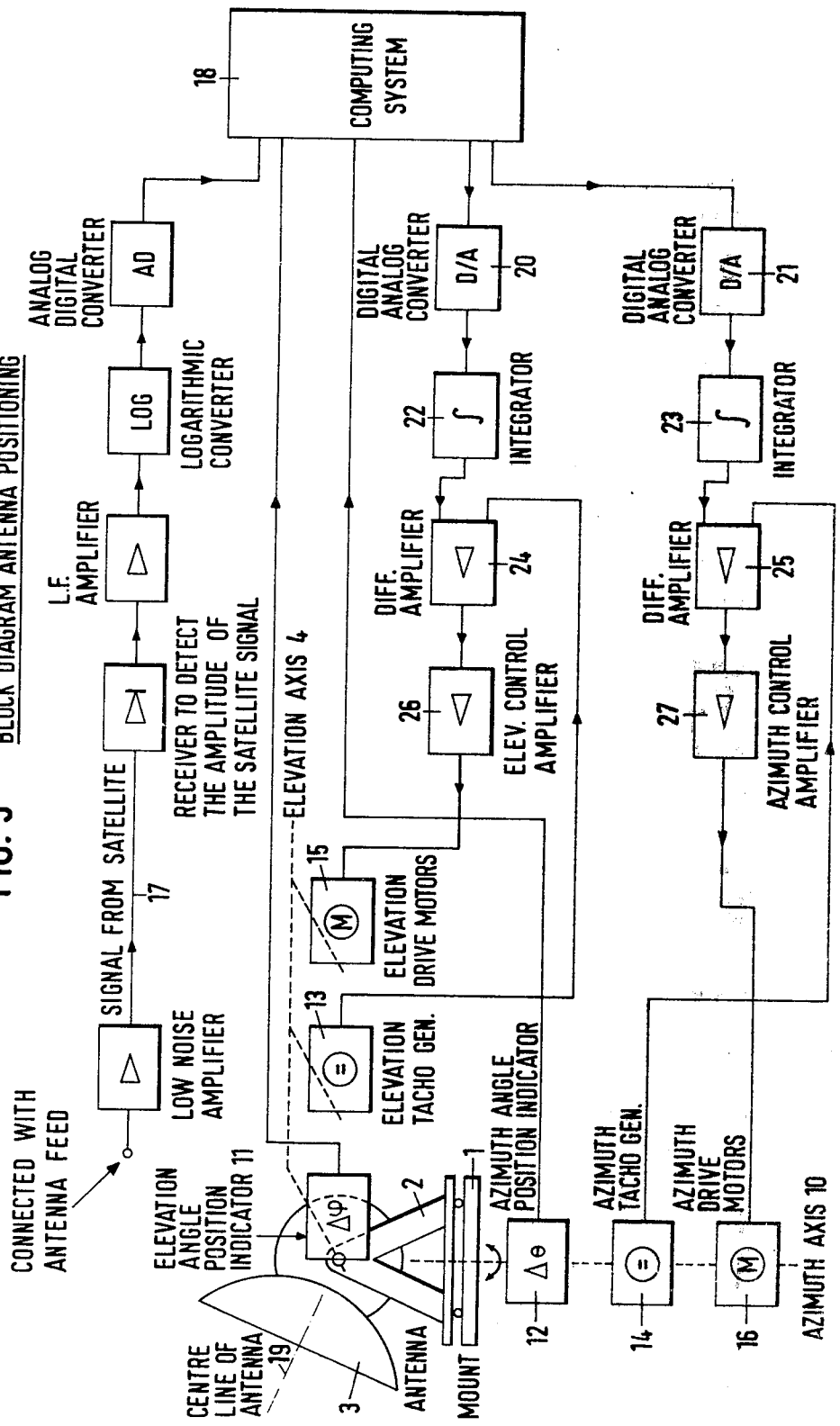
FIG. 5 is a block diagram showing the antenna positioning.

As shown in the diagram of FIG. 5, the antenna 3 can be pointed towards any point of the upper hemisphere by a combined movement about two orthogonal axis, the so called elevation 4 and azimuth 10 axis. Each axis is coupled with an angle position indicator 11 resp. 12 (Manufacturer HEIDENHAIN, Type ROD 7/98.1, angle resolution 0.002°), a tacho generator 13 resp. 14 and a drive unit 15 resp. 16. The upper branch 17 shows the signal flow of the satellite signal from antenna feed to the computing system (type PDP 11) 18. The digital signals delivered by the position indicators 11, 12 are also led to the computer 18. The jitter movement of the antenna and the small antenna beamwidth causes the signal received from the satellite to fluctuate. Thanks to these fluctuations it is possible to determine the position of the center line 19 of the antenna (FIG. 5) with respect to the optimum position (i.e. center line directed to the satellite). A special program is implemented in the computing system to compute this position. The program takes into account the influence of (thermal and quantization) noise and the occurrence of fading. With the help of these computations the computing system instructs a control circuit to readjust the antenna position. In the block diagram the control circuits are shown in more detail to reveal the application of the feedback. In the described two loops for azimuth and two loops for elevation are to be distinguished. The first loop in both cases contains the tacho generator 13, 14 to realize velocity feedback i.e. the relation between antenna velocity and the control variable becomes less dependent on torques delivered by wind and friction. The second loop in both cases is formed by the chain; (a part of) the computing system 18, D/A convertor 20,21, integrator 22,23, difference amplifier 24,25, control amplifier 26,27, drive motor 15,16, position indicator 11,12. The purpose of this loop is to obtain a zero error in angular position of the antenna in the constant velocity mode and a small error in the constant acceleration mode.

A numerical example showing the search for the desired antenna position is given hereafter.

An extensive computer simulation based on the measured values of essential antenna parameters has been carried out. The results of this simulation are representative for the practical situation because every factor influencing the positioning procedure is taken into consideration. For this reason the measured antenna parameters (in particular the antenna diagram and the behaviour of antenna jitter i.e. the uncontrolled changes of position made by the antenna) are supplemented by measurements of receiver noise and fading characteristics. The simulation is carried out as follows.

A computer generates each second a sample representing the amplitude of the received signal from a satellite and with the same statistical parameters, the signal is received with an antenna position supposed to be in (x,y) with respect to the optimum position (0,0). After the generation of about twenty samples the computing procedure is started. In this computation the relatively slow signal attenuation due to fading is approximated by a higher order polynomial function. Regression is executed to find the best fit radiation diagram matching to the collected twenty samples of signal strength as a function of position and time. The regression calculates the starting position (x,y) with a certain inaccuracy. After this, again twenty samples are generated for the same position (x,y) and the computation is restarted. For the purpose to determine the accuracy of the method applied the simulation is extended for a 5 minute period. After this 5 minutes period the procedure is stopped and the results are evaluated.

NUMERICAL EXAMPLES

Figure 6:
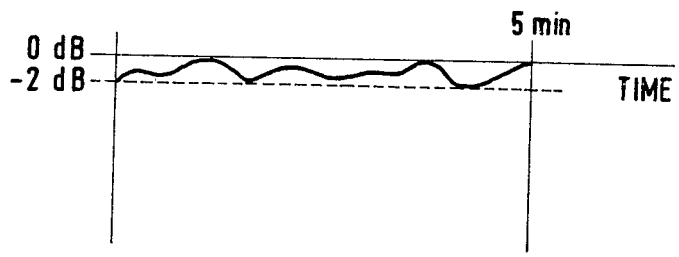
FIG. 6, 7 and 8 show different 5 minutes signal characteristics.
Figure 7:
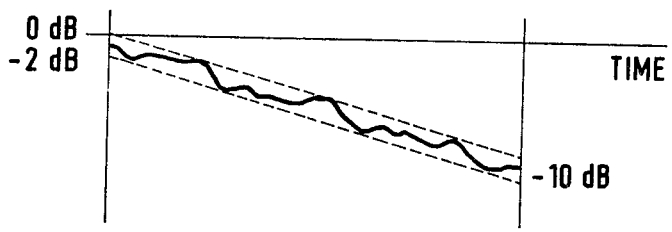
Figure 8:
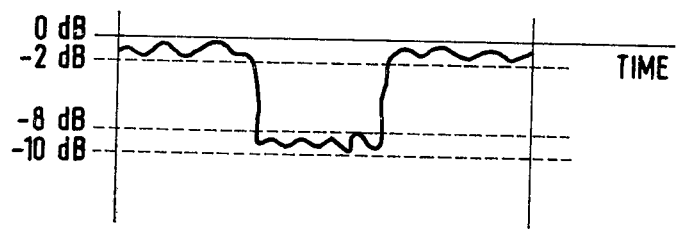

The following examples are restricted to some striking results of investigation for the following cases:
Concerning position:
(1) the antenna is pointed in the optimum position;
(2) the antenna has a deviation with respect to the optimum position of 0.18 degrees in elevation (=y) and 0.18 degrees in azimuth (=x); this means that the (x,y) position is at a −20dB point of the main beam.
Concerning fading type:
(A) fading with a rather smooth characteristic (FIG. 6);
(B) fading with a ramp characteristic (FIG. 7) and
(C) fading with a step characteristic (FIG. 8).

Figure 10:
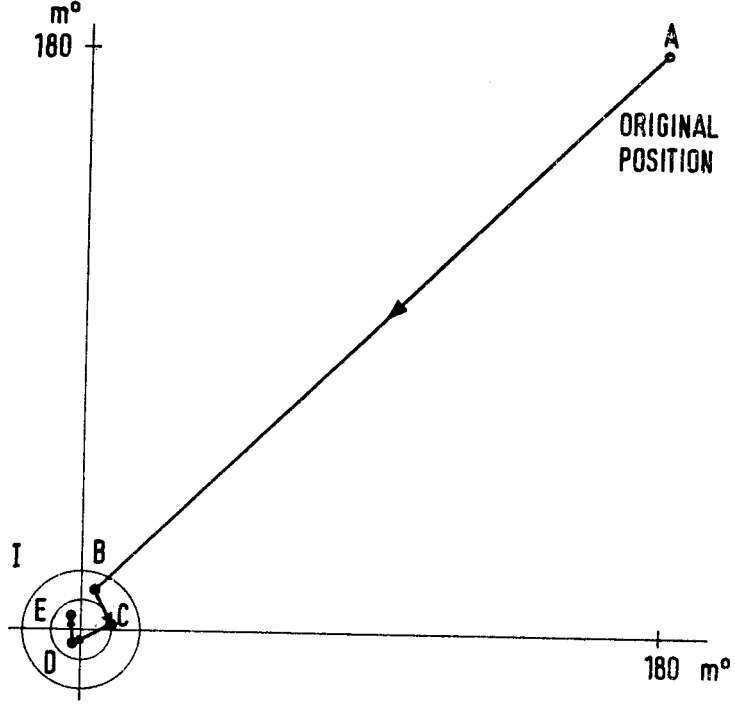
FIG. 10 is a diagram indicating a possible number of points gone through by the antenna axis according to the invention.

The values of the calculated position (with respect to the optimum position) averaged over a 5 minutes period for both directions (azimuth: $\mu_x$, elevation: $\mu_y$) are tabulated together with the values of the standard deviation calculated over the same period and based on a 20 sec cycle time (Ox, Oy). In the table (FIG. 9) three successive periods of 5 minutes are reported. The conclusion can be made that after a 20 sec cycle the tracking is maintained (pos. 1) and considerably progression towards the optimum position is made (pos. 2). Finally the results are given likewise for a 3×5 minutes period, considering all fading types. Over each 5 minutes period and for each fading model the maximum value for $|\mu_x - X|$ and $|\mu_y - Y|$ is chosen. The worst case error $\sqrt{\mu_x - X^2 + \mu_y - Y^2}$ is calculated and plotted in FIG. 10. After one period the antenna is moved to a point B inside circle I, for a second period computations are continued for this point and successively following steps are made until the antenna is in the tracking region. It turns out to be that the antenna remains pointed inside a circle with a maximum radius of 5.9 m°, the last value may be interpreted as a rest deviation. The value being smaller than the jitter value of 8 m°.

As it has already been said the method according to the invention makes use of the uncontrolled movement of the antenna as described above, which movement is registered by the angular position indicators. Together with each registration of the antenna position the attendant signal strength is registered as well. Now the method is such that the optimum antenna position is calculated by means of a regression technique from the measuring data collected during a certain period of time, use being made of the direction diagram of the antenna. In the simplest regression technique the signal strength is regarded as a function of time, approximated in the best possible way by a constant to be determined. In that case the period of measuring has still to be rather long. The gain of time as compared with the step-track technique is in this case only obtained because better and sometimes larger steps can be made towards the optimum. After having calculated the optimum antenna position, if necessary by means of a number of separate calculations, and by making use of one of the regression techniques, the controlling system can then point the antenna at that point.

Although there has been question of a geo-stationary satellite in the above the method according to the invention can also be employed for tracking a non-stationary satellite having a mainly known orbit. In the latter case the method leads to a somewhat deviating orbit, which ensures a stronger received signal.

The invention offers a method for the precise and quick tracking of a satellite, which is no more expensive than the known antenna controlling methods.

A more refined and quicker method is obtained if the signal fluctuations in consequence of atmospheric influences are approximated over a rather short time interval in the best possible way by a higher order polynomial (with constants still to be determined) as time function. Said regression technique offers at the same time the possibility to eliminate unreliable results which will occur in the case of very strong fluctuations.

By means of simultation techniques it has been proved that an antenna in a position at 20 dB from the optimum has reached the top after two steps.

What we claim is:

1. Method for controlling an antenna of an earth station for telecommunication via satellites, the antenna being provided with means to determine the position of the antenna and with means to ascertain the strength of a received signal, the method comprising:
    orienting an antenna to a controlled predetermined position relative to a satellite and maintaining said antenna at said predetermined position for a predetermined period of time, the antenna being subjected to and being capable of assuming a plurality of uncontrolled small changes of position with respect to said predetermined position;
    measuring the signal strength of the signal received by said antenna at a plurality of given positions of said antenna within the range of said uncontrolled position changes of said antenna for said predetermined period of time and while antenna is at said controlled predetermined position;
    determining the direction of maximum received signal strength as a function of said measured received signal for said predetermined period of time at said plurality of given positions within the range of said uncontrolled position changes; and then
    controllably moving said antenna to a new predetermined position in the direction of said maximum received signal strength with a determined during said direction determining step.

2. Method in accordance with claim 1, wherein signal fluctuations over a comparatively short time interval are approximated by a higher order polynomial as a time function.

3. Apparatus for controlling an antenna of an earth station for telecommunication via satellites, comprising:
    an antenna provided with means for determining the position thereof;
    means coupled to said antenna for orienting said antenna to a controlled predetermined position relative to a satellite and maintaining said antenna at said predetermined position for a predetermined period of time, the antenna being subjected to and being capable of assuming uncontrolled small changes of position with respect to said predetermined position;
    means coupled to said antenna for measuring the signal strength of the signal received by said antenna at a plurality of given positions of said antenna within the range of said uncontrolled position changes of said antenna for said predetermined period of time and while antenna is at said controlled predetermined position;
    means for determining the direction of the maximum strength received signal of said antenna as a function of said measured received signal for said predetermined period of time at said plurality of given positions within the range of said uncontrolled position changes; and
    means coupled to said direction determining means for controllably moving said antenna to a new predetermined position in the direction of said maximum strength received signal as determined by said direction determining means.

* * * * *

UNITED STATES PATENT AND TRADEMARK OFFICE
CERTIFICATE OF CORRECTION

PATENT NO. : 4,247,857

DATED : January 27, 1981

INVENTOR(S) : Robert Wilcke and Antoon A.J. Otten

It is certified that error appears in the above—identified patent and that said Letters Patent is hereby corrected as shown below:

Column 5, line 29, change the expression: $"\sqrt{\mu_x - X^2 + \mu_y - Y^2}"$ to $$--\sqrt{\left|\mu_x - X\right|^2 + \left|\mu_y - Y\right|^2} --;$$

Column 6, line 25, after "while" insert --said--;

Column 6, line 58, after "while" insert --said--.

UNITED STATES PATENT AND TRADEMARK OFFICE
CERTIFICATE OF CORRECTION

PATENT NO. : 4,247,857

DATED : January 27, 1981

INVENTOR(S) : Robert Wilcke and Antoon A.J. Otten

It is certified that error appears in the above—identified patent and that said Letters Patent is hereby corrected as shown below:

COLUMN 6, line 34 (claim 1), after "received signal strength" change "with a" to --which is--.

Signed and Sealed this

Nineteenth Day of May 1981

[SEAL]

Attest:

RENE D. TEGTMEYER

Attesting Officer     Acting Commissioner of Patents and Trademarks